(12) United States Patent
Bhat et al.

(10) Patent No.: US 7,407,046 B2
(45) Date of Patent: Aug. 5, 2008

(54) ADAPTIVE CONTROL OF EXTERNALLY CONTROLLED FAN DRIVE

(75) Inventors: Nikhil D. Bhat, Farmington Hills, MI (US); Masato Yamada, Westbloomfield, MI (US); Sameer A. Joshi, Norristown, PA (US); Ananthakrishnan Surianarayanan, Lansdale, PA (US)

(73) Assignee: USUI International Corp., Plymouth, MI (US)

( * ) Notice: Subject to any disclaimer, the term of this patent is extended or adjusted under 35 U.S.C. 154(b) by 196 days.

(21) Appl. No.: 11/235,428

(22) Filed: Sep. 26, 2005

(65) Prior Publication Data

US 2007/0068762 A1     Mar. 29, 2007

(51) Int. Cl.
*F16D 35/02* (2006.01)
(52) U.S. Cl. ..................................... 192/58.61; 701/68
(58) Field of Classification Search ............... 192/58.6, 192/58.61; 701/68
See application file for complete search history.

(56) References Cited

U.S. PATENT DOCUMENTS

| | | | |
|---|---|---|---|
| 2,879,755 A | 3/1959 | Weir | |
| 2,988,188 A | 6/1961 | Tauschek | |
| 3,059,745 A | 10/1962 | Tauschek | |
| 3,217,849 A | 11/1965 | Weir | |
| 3,259,221 A | 7/1966 | Godfrey | |
| 3,272,188 A | 9/1966 | Sabat | |
| 3,430,743 A | 3/1969 | Fujita et al. | |
| 3,463,282 A | 8/1969 | Fujita et al. | |
| 3,642,105 A | 2/1972 | Kikuchi | |
| 3,727,354 A | 4/1973 | Powell | |
| 3,840,101 A | 10/1974 | Peter et al. | |
| 3,856,122 A | 12/1974 | Leichliter | |
| 3,893,555 A | 7/1975 | Elmer | |
| 3,924,585 A | 12/1975 | Woods | |
| 3,964,582 A | 6/1976 | Mitchell | |
| 4,228,880 A * | 10/1980 | Gee | 192/58.61 |
| 4,238,016 A | 12/1980 | Yoshida et al. | |
| 4,281,750 A | 8/1981 | Clancey | |
| 4,403,684 A | 9/1983 | Haeck | |
| 4,505,367 A | 3/1985 | Martin | |
| 4,629,046 A | 12/1986 | Martin | |
| 4,665,694 A | 5/1987 | Brunken | |
| 4,667,791 A | 5/1987 | Martin et al. | |
| 4,685,549 A | 8/1987 | Brunken et al. | |
| 4,699,258 A | 10/1987 | Johnston et al. | |
| 4,796,571 A | 1/1989 | Ono et al. | |
| 4,846,331 A | 7/1989 | Ono | |
| 4,850,465 A | 7/1989 | Ono | |
| 4,903,643 A | 2/1990 | Takikawa et al. | |
| 4,930,458 A | 6/1990 | Takikawa et al. | |

(Continued)

FOREIGN PATENT DOCUMENTS

JP      54-25581 B2     8/1979

(Continued)

*Primary Examiner*—Richard M Lorence
(74) *Attorney, Agent, or Firm*—Gerald E. Hespos; Anthony J. Casella (57) ABSTRACT

An externally controlled fan drive includes a fluid clutch that alters torque delivered to a fan housing to rotate the fan housing at a target fan speed. An adaptive controller measures the actual fan speed and adaptively updates the control logic to compensate for variable physical characteristics of the fan device.

6 Claims, 5 Drawing Sheets

U.S. PATENT DOCUMENTS

| | | | |
|---|---|---|---|
| 5,004,085 A | 4/1991 | Taureg | |
| 5,018,612 A | 5/1991 | Takikawa et al. | |
| 5,060,774 A | 10/1991 | Takikawa et al. | |
| 5,090,533 A | 2/1992 | Inoue | |
| 5,101,949 A | 4/1992 | Takikawa et al. | |
| 5,109,965 A | 5/1992 | Inoue | |
| 5,119,920 A | 6/1992 | Inoue | |
| 5,125,491 A | 6/1992 | Takikawa et al. | |
| 5,139,125 A | 8/1992 | Takikawa et al. | |
| 5,232,074 A | 8/1993 | Watanabe | |
| 5,452,782 A | 9/1995 | Inoue | |
| 5,501,183 A | 3/1996 | Takayama | |
| 5,575,368 A | 11/1996 | Kikuchi et al. | |
| 5,636,719 A | 6/1997 | Davis et al. | |
| 5,794,749 A | 8/1998 | Ryuu | |
| 5,881,857 A | 3/1999 | Ryuu | |
| 5,960,918 A | 10/1999 | Moser et al. | |
| 6,013,003 A | 1/2000 | Boffelli et al. | |
| 6,032,772 A | 3/2000 | Moser et al. | |
| 6,079,536 A * | 6/2000 | Hummel et al. | 192/58.62 |
| 6,102,177 A | 8/2000 | Moser et al. | |
| 6,125,981 A | 10/2000 | Ito et al. | |
| 6,247,567 B1 | 6/2001 | Watanabe | |
| 6,318,531 B1 | 11/2001 | Usoro et al. | |
| 6,550,596 B2 | 4/2003 | Shiozaki et al. | |
| 6,585,092 B1 | 7/2003 | Smith et al. | |
| 6,591,174 B2 * | 7/2003 | Chung et al. | 701/36 |
| 6,634,476 B2 | 10/2003 | Inoue et al. | |
| 6,648,115 B2 * | 11/2003 | Smith et al. | 192/21.5 |
| 6,807,926 B2 | 10/2004 | Shiozaki et al. | |
| 6,811,009 B2 | 11/2004 | Inoue et al. | |
| 6,915,888 B2 | 7/2005 | Shiozaki et al. | |
| 7,128,690 B2 | 10/2006 | Inoue et al. | |
| 2004/0223851 A1 * | 11/2004 | Shiozaki et al. | 417/15 |

FOREIGN PATENT DOCUMENTS

| | | |
|---|---|---|
| JP | 55-76226 A | 6/1980 |
| JP | 57-1829 A | 1/1982 |
| JP | 57-167533 A | 10/1982 |
| JP | 57-179431 A | 11/1982 |
| JP | 59-27452 B2 | 7/1984 |
| JP | 62-124330 A | 6/1987 |
| JP | 62-194038 A | 8/1987 |
| JP | 63-182332 U | 11/1988 |

* cited by examiner

ADAPTIVE CONTROL OF EXTERNALLY CONTROLLED FAN DRIVE

BACKGROUND OF THE INVENTION

1. Field of the Invention

The invention relates to fans for cooling engines and to the control of such fans for accurately matching the cooling needs of the engine.

2. Description of the Related Art

Engines, such as the engines of automotive vehicles, generate heat during use and are subject to broad ranges of environmental heat. Accordingly, engines must be cooled to prevent overheating. The cooling needs of the engine are dependent upon characteristics of the engine, ambient temperature and the operating speed of the engine. Most engines are cooled by a liquid coolant that flows through channels in proximity to the engine. Heat from the engine is transferred to the coolant, and the heated coolant then passes through a heat exchanger or radiator. A fan directs cool air through the radiator to effect the cooling of the liquid.

The cooling rate is dependent partly upon the temperature of the cooling liquid, the temperature of the air and the rate of flow of the cooling air. The rate of flow of cooling air is dependent upon the rotational speed of the fan, and the speed of the vehicle.

Some prior art engines are configured to have the fan rotate sufficiently fast to accommodate all anticipated cooling needs. However, the fan is driven by the engine, and hence the engine operates less efficiently when there is more energy diverted to the operation of the fan. Additionally the rotating fan creates noise that is roughly proportional to the rotating speed of the fan. Thus, the fans in these prior art systems often generate more fan noise than is required.

Problems associated with fan noise and engine operating efficiencies are well known in the art, and there have been many efforts to match the fan speed to the cooling needs of the engine. The assignee of the subject invention has done considerable work in the field of fan fluid clutches that have proved to be very effective in matching the fan speed to the cooling needs of the engine.

The typical fan fluid clutch has a driving disc fixedly mounted to a rotating shaft of an engine. Thus, the driving disc rotates at the speed of the shaft of the engine. A housing is mounted rotatably to the shaft by bearings. Thus, the rotating shaft does not rotate the housing directly. Fan blades are mounted to the exterior of the housing. The interior of the housing includes a torque transmission chamber that surrounds the drive disc and an oil reservoir spaced from the torque transmission chamber. However, one or more oil supply holes and an oil recirculation passage provide communication between the oil reservoir and the torque transmission chamber.

A torque transmission fluid is placed in the oil reservoir and can flow into the torque transmission chamber via the oil supply hole between the oil reservoir and the torque transmission chamber. The torque transmission fluid transmits torque from the drive disc to the housing in proportion to the contact area of the torque transmission fluid with both the drive disc and the housing.

A valve is mounted in the housing and controls the oil supply hole between the oil reservoir and the torque transmission chamber. The valve opens when cooling needs are high. Hence, more oil will flow into the torque transmission chamber at these times. The greater amount of oil in the torque transmission chamber results in greater torque transmission between the drive disc and the housing. Under these conditions, the housing and the fan blades thereon rotate faster to provide more cooling. The valve closes the oil supply hole between the oil reservoir and the torque transmission chamber when cooling needs are low. As a result, less oil will flow into the torque translation chamber and the drive disc will transmit less torque to the housing. Under these conditions, the housing rotates more slowly and the fan blades on the housing direct less cooling air towards the engine. Additionally less energy is diverted from the engine to the fan when cooling needs are low, and therefore the engine operates more efficiently.

Fan fluid clutches are described extensively in the patent literature, including many U.S. patents assigned to the assignee of the subject invention. The simplest of these devices provides a temperature sensor, such as a bi-metal strip, at an exterior position on the housing. The temperature sensor communicates with the valve to open the oil supply hole during periods of high temperature and to close the oil supply hole during periods of lower temperatures.

More sophisticated fan fluid clutches have been developed in recent years and provide more inputs for controlling the movement of the valve that opens and closes the oil supply hole between the oil reservoir and the torque transmission chamber. These more sophisticated systems measure conditions such as: ambient temperature, vehicle speed, engine speed, air conditioning operating parameters, transmission oil temperature and the like. A controller is programmed with logic to determine a target fan speed (TFS) based on an analysis of these inputs. The controller then operates an electromagnet to move the valve relative to the oil supply hole. More particularly, the controller is programmed and calibrated to turn the electromagnet on and off for opening and closing the valve at a "duty rate" (DR) that is intended to achieve the appropriate volume of oil in the torque transmission chamber, and hence to achieve the target fan speed TFS. A prior art system that provides for outside control of the fan coupling is shown, for example in U.S. Pat. No. 6,550,596 and U.S. Pat. No. 6,915,888, which are assigned to the assignee of the subject invention. The disclosures of U.S. Pat. No. 6,550,596 and U.S. Pat. No. 6,915,888 are incorporated herein by reference.

Some recent efforts in the field of externally controlled fan drives employ "smart fluid" in a torque transmission chamber. These systems use a constant volume of fluid in the torque transmission chamber, and hence avoid the use of condition responsive valves to control the volume of fluid in the torque transmission chamber. Rather, these recent efforts attempt to control the torque transmission characteristics of a fixed volume of fluid. For example, a magnetic field can be applied in a controlled manner to alter the viscosity of the torque transmission fluid. Examples of these externally controlled fan drives are described in U.S. Pat. No. 5,960,918, U.S. Pat. No. 6,032,772, U.S. Pat. No. 6,102,177, U.S. Pat. No. 6,318,531 and U.S. Pat. No. 6,585,092, the disclosures of which are incorporated herein by references.

Prior art externally controlled fan devices (ECFD's) are better at achieving the target fan speed when the engine and the fan coupling apparatus are new. However, the ability to achieve the target fan speed TFS deteriorates over time. This deterioration is due to gradual wear of components in the fan coupling device and/or changes in the viscosity of the torque transmission fluid. These externally controlled fan devices measure the actual fan speed AFS and compare the actual fan speed AFS to the target fan speed TFS. These devices then change the duty rate DR in an effort to narrow or eliminate the difference between the target fan speed TFS and the actual fan speed AFS. However, the control logic in the prior art controller is calibrated based on new fan coupling apparatus and hence may not consistently match the target fan speed TFS if the externally controlled fan drive undergoes deterioration over time. As a result, these recent prior art externally controlled fan drives tend to swing the actual fan speed AFS substantial amounts to one side or the other of the target fan speed TFS. Prior art externally controlled fan drives that focus directly on the duty rate DR often provide less cooling than is required or more cooling, and hence less efficient engine operation. U.S. Pat. No. 6,807,926 is one example of a prior art externally controlled fan drive that includes actual fan speed as an input to the controller. This system has plural oil supply holes and plural valves. The duty rate DR of the respective valves are changed independently of one another in an effort to bring the actual fan speed AFS closer to the target fan speed TFS. However, a plural valve system is more complex then a single valve system. Furthermore, externally controlled fan drives that focus primarily on the duty rate DR are known to swing widely on one side or the other of the target fan speed TFS, as explained above.

Accordingly, an object of the subject invention is to provide an outside control-type fan coupling apparatus that provides optimum cooling for an engine substantially uniformly over a long period of time.

SUMMARY OF THE INVENTION

The invention relates to an adaptive control system for an externally controlled fan drive. The mechanical components of the externally controlled fan drive may be similar to the fan drive developed by the assignee of the subject invention and disclosed in the above-referenced U.S. Pat. No. 6,550,596 or U.S. Pat. No. 6,915,888. In particular, the fan drive may include a drive disc mounted to a shaft that is rotatably driven by the engine. The fan drive further includes a housing rotatably mounted relative to the shaft by bearings. An array of fan blades may be mounted to the exterior of the housing.

A fluid reservoir and a torque transmission chamber may be formed in the housing. The torque transmission chamber surrounds the drive disc with a small gap therebetween. An oil supply hole may be formed in the housing to provide communication between the fluid reservoir and the torque transmission chamber. A recirculation passage then may be provided at a radially outer position on the housing to provide a return flow path between the torque transmission chamber and the fluid reservoir.

A torque transmission fluid is provided in the housing and may circulate from the fluid reservoir to the torque transmission chamber back to the fluid reservoir. The torque transmission fluid has a consistency and viscosity to transmit torque from the drive disc to the housing. Thus, the torque transmission fluid enables the housing to be rotated in response to rotation of the drive disc. The amount of torque transmitted from the drive disc to the housing may be a function of the amount of torque transmission fluid in the torque transmission chamber. However, the amount of torque transmitted also may be a function of the characteristics of the fluid (e.g. viscosity) for a system using a fluid with controllable torque transmission characteristic.

A valve may be provided in the housing for selectively opening and closing the oil supply hole between the fluid reservoir and the torque transmission chamber. Thus, the amount of torque transmission fluid that can flow into the torque transmission chamber may be determined by the operation of the valve. The valve preferably is operated by an electromagnet that repeatedly opens and closes the valve at a duty rate for controlling the flow of torque transmission fluid through the oil supply hole. Alternatively, an electromagnet may be used to vary the viscosity of the torque transmission fluid.

The fan drive of the subject invention further includes an external controller. The controller is operative to receive input data relating to parameters that affect cooling needs. The inputs to the controller may include the throttle position, vehicle speed, engine speed, air conditioner operating conditions, transmission oil temperature, ambient temperature, actual fan speed and the like. The output of the controller may be a specified duty rate intended to achieve a target fan speed.

As noted above, the efficiency of the prior art external control apparatus for a fan fluid coupling changes over time. Even though the control apparatus works well initially, effectiveness and efficiency degrade over time. Accordingly, the externally controlled fan drive of the subject invention includes an adaptive controller that continuously adjusts the control logic based on the sensor inputs, including the past and existing actual fan speeds. The adaptive controller may use a deterministic autoregressive moving average (DARMA) model where the current output is represented as a linear combination of past outputs and past and present inputs. Alternatively, other adaptive models may be used. Furthermore, a recursive least square algorithm may be used to continuously estimate the coefficients of the model. As a result, the adaptive controller does not merely change the duty rate, but continually revises the control logic based on a continual analysis of past and present outputs and inputs. Furthermore, the assessment of trends performed by the adaptive controller permits the adaptive controller to predict performance trends. Thus, in certain instances, the control logic can be altered preemptively to avoid a time delay between an assessment of operating conditions and a response to those operating conditions. Accordingly, the adaptive controller provides the optimum control algorithm for the current operating condition of the fan drive. The adaptive controller also can be used to compensate for changes to original equipment in a vehicle (e.g., air conditioning vs. no air conditioning or automatic transmission vs. standard transmission) without a complex recalibration of the controller. The development and application of an algorithm may include applying a variable forgetting factor for deleting actual fan speed and duty rate data older than a selected age.

DETAILED DESCRIPTION OF THE PREFERRED EMBODIMENT

Figure 1:
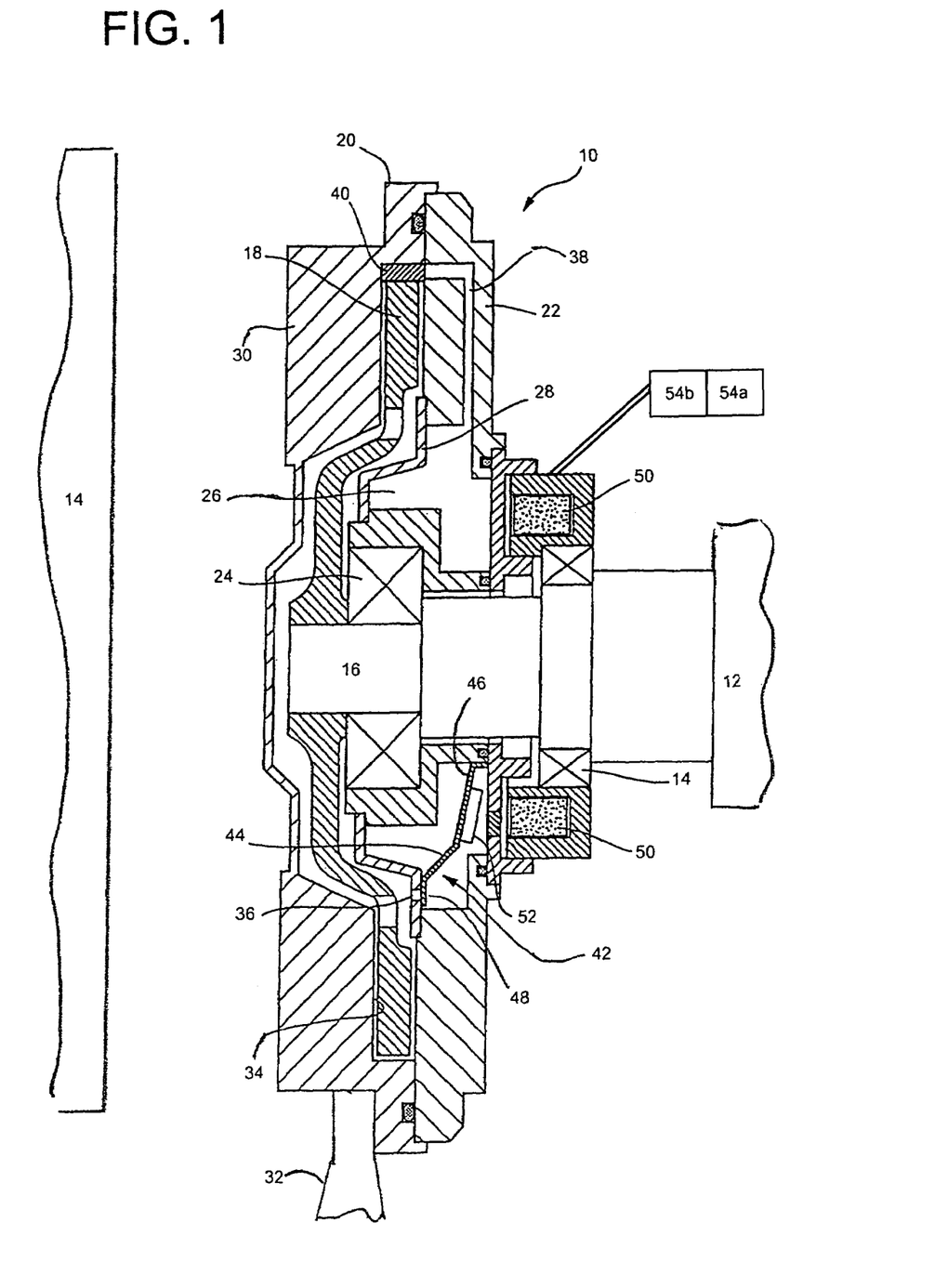
FIG. 1 is a longitudinal view of an external control fan coupling device in accordance with the subject invention.

An externally controlled fan device (ECFD) in accordance with the invention is identified generally by the numeral 10 in FIG. 1. The fan device 10 is used with an engine 12, such as the internal combustion engine of an automotive vehicle. The engine 12 generates heat and must be cooled to ensure continued efficient performance. Accordingly, a cooling fluid is circulated in and near critical parts of the engine 12. Heat from the engine is transferred to the coolant, thereby raising the temperature of the cooling fluid. The heated cooling fluid then is circulated through a radiator that is identified generally by the numeral 14. The fan device 10 is operative to generate a flow of air adjacent to the various heat exchange channels in the radiator 14 for cooling the fluid that had been heated by the engine 12. The cooler fluid then is recirculated back to the engine 12. The cooling needs of the engine 12 vary in accordance with several parameters, including the throttle position, the speed of the engine 12, ambient air temperature, air conditioning operating characteristics, coolant temperature and such. The externally controlled fan coupling device 10 functions to generate flow of cooling air sufficient to achieve a heat transfer in the cooling fluid so that the cooling fluid can cool the engine appropriately.

The fan coupling device 10 is mounted to a shaft 16 that is driven by the engine 12. A drive disc 18 is mounted fixedly to an end of the shaft 16, and hence rotates at the input speed of the shaft 16 and the engine 12.

A sealed housing 20 is mounted rotatably on the shaft 16. More particularly, the sealed housing 20 includes a casing 22 mounted around a portion of the shaft 16 by bearings 24. Thus, the shaft 16 rotates substantially independently of the casing 22. The casing 22 is formed to define an oil reservoir 26 that is enclosed by a partition 28. The drive disc 18 is mounted to a portion of the shaft 16 that projects beyond the casing 22 and the partition 28. The sealed housing 20 further includes a cover 30 mounted substantially rigidly to the casing 22. Thus, the casing 22, the partition 28 and the cover 30 are rotatable in unison and substantially independently of the shaft 16 and the drive disc 18. Fan blades 32 are mounted to the exterior of the sealed housing 20 and rotate with the sealed housing 20 to generate a flow of cooling air across the radiator 14.

The casing 22, the partition 28 and the cover 30 are configured to define a torque transmission chamber 34 that surrounds the drive disc 18. An oil supply hole 36 extends through the partition 28 at a substantially radially outer position of the oil reservoir 26 to provide communication between the oil reservoir 26 and the torque transmission chamber 34. An oil recirculation passage 38 is formed through the casing 22 and provides communication between a radially outer position in the torque transmission chamber 34 and the oil reservoir 26. A dam 40 is disposed at a radially outer position in the torque transmission chamber 34 and in proximity to the oil recirculation passage 38.

A viscous oil is disposed initially in the oil reservoir 26, but can flow through the oil supply hole 36 and into the torque transmission chamber 34. Oil in the torque transmission chamber 34 will transfer torque from the drive disc 18 to the sealed housing 20. As a result, the sealed housing 20 will rotate with the drive disc 18, and the fan blades 32 on the sealed housing 20 will generate a flow of cooling air across the radiator 14. Centrifugal forces will urge the oil into outer positions in the torque transmission chamber 34. The dam 40 then will urge the oil into the oil recirculation passage 38 and back to the oil reservoir 26.

The amount of torque transferred from the drive disc 18 to the sealed housing 20 varies in accordance with the amount of oil in the torque transmission chamber 34. More oil in the torque transmission chamber 34 transmits more torque from the drive disc 18 to the sealed housing 20. This greater torque results in greater rotational speeds of the sealed housing 20 and hence a higher flow of cooling air generated by the fan blades 32. Less oil in the torque transmission chamber 34 results in a lower torque transfer from the drive disc 18 to the sealed housing 20. The lower torque results in lower rotational speeds of the sealed housing 20 and hence a lower flow of cooling air generated by the fan blades 32.

The amount of oil in the torque transmission chamber 34 is controlled by a valve 42 mounted in the oil reservoir 26 in a position for selectively opening and closing the oil supply hole 36. More particularly, the valve 42 includes a leaf spring 44 with a fixed end 46 and a movable end 48. The leaf spring 44 can be deflected from a position where the movable end 48 of the leaf spring 44 closes the oil supply hole 36 to a position where the movable end 48 of the leaf spring 44 opens the oil supply hole 36. Movement of the leaf spring 44 into a position for closing the oil supply hole 36 will interrupt the flow of oil into the torque transmission chamber 34 without interrupting the flow of oil from the torque transmission chamber 34, through the oil recirculation passage 38 and back into the reservoir 26. Hence, movement of the leaf spring 44 into a position for blocking the oil supply hole 36 will result in a gradual reduction of the amount of oil in the torque transmission chamber 34, thereby resulting in less torque transmitted from the drive disc 18 to the sealed housing 20. As a result, the closing of the oil supply hole 36 by the leaf spring 44 lowers the rotational speed of the sealed housing 20 and decreases cooling effect achieved by the fan blades 32. Conversely, movement of the leaf spring 44 into a position for opening the oil supply hole 36 results in a greater flow of oil from the oil reservoir 26 into the torque transmission chamber 34. As a result, movement of the leaf spring 44 into position for opening the oil feed hole 36 permits a greater torque transfer from the drive disc 18 to the sealed housing 20. Consequently, the sealed housing 20 will rotate faster and the fan blades 32 will generate a higher flow of cooling air.

The opening and closing of the oil supply hole 36 is controlled by an electromagnet 50 mounted rotatably on the shaft 16 and opposed to a portion of the casing 22 near the valve 42. In particular, activation of the electromagnet 50 will attract an armature 52 on the leaf spring 44 and will urge the leaf spring 44 away from the oil supply hole 36. Conversely, the leaf spring 44 will return resiliently to a position for closing the oil feed hole 36 when the electromagnet 50 is deactivated. The electromagnet 50 is pulse width modulated PWM to sequentially open and close the oil supply hole 36. The duty rate DR of the pulse width modulated signal controls the proportion of time that the valve 42 remains open. The pulse width modulated duty rate DR can vary between 0%, corresponding to a valve 42 that is not opened and 100%, corresponding to a valve 42 that is open continuously. During most operating conditions, the duty rate DR will be between these two extremes. The valve 42 will open more often and/or for longer times to generate greater flows of cooling air. Conversely, the valve 42 will close more often and/or for longer periods of time to achieve less cooling.

The duty rate DR achieved by the electromagnet 50 is based on a control signal that is input to the electromagnet 50 from an adaptive controller 54b, which in turn receives input from an external input analyzer 54a. The external input analyzer 54a generates a target fan speed TFS required to achieve the necessary cooling based on information from different sensors, such as engine coolant temperature sensors, intake air temperature sensors, a vehicle speed sensor, an engine speed sensor, a throttle position sensor and a sensor for air conditioner operating conditions. The algorithm or logic utilized by the external input analyzer may vary from one vehicle to another and typically the logic or the algorithm will be developed by the vehicle manufacturer. The control signal will dictate a target fan speed TFS appropriate for achieving the necessary cooling. This differs from the prior systems where the control signal generates a precalibrated duty rate DR associated with a target fan speed TFS.

As noted above, physical characteristics of the externally controlled fan device 10 may result in an actual fan speed AFS that differs from the target fan speed TFS that was intended to have been produced by the duty rate DR dictated by the controller. This difference between the actual fan speed AFS and the target fan speed TFS can be caused by dimensional differences attributable to manufacturing tolerances. Alternatively, the difference between the actual fan speed AFS and the target fan speed TFS can be attributable to physical changes in the externally controlled fan device 10 that develop over time. For example, the viscosity of the oil may change, wear debris may accumulate in the oil, the resiliency of the leaf spring 44 can change, the bearing 24 can wear or parts of the fan coupling device 10 may be damaged due to unintended contact. Any of these changes can cause the actual fan speed AFS to be less than the target fan speed TFS or greater than the target fan speed TFS. Additionally, any of these conditions can cause the actual fan speed AFS to be greater than the target fan speed TFS under certain operating conditions, but less than the target fan speed TFS under other operating conditions.

In view of the above, the controller 54b of the externally controlled fan coupling device 10 is an adaptive controller. The adaptive controller 54b is operative for measuring the actual fan speed AFS and then using the measured actual fan speed AFS as an input. The duty rate DR also is an input. The adaptive controller 54b then uses the various inputs over time, including the duty rate DR and the actual fan speed AFS, and generates an updated control algorithm or logic to achieve a duty rate DR that will keep the actual fan speed AFS at or very near the target fan speed TFS.

Figure 2:
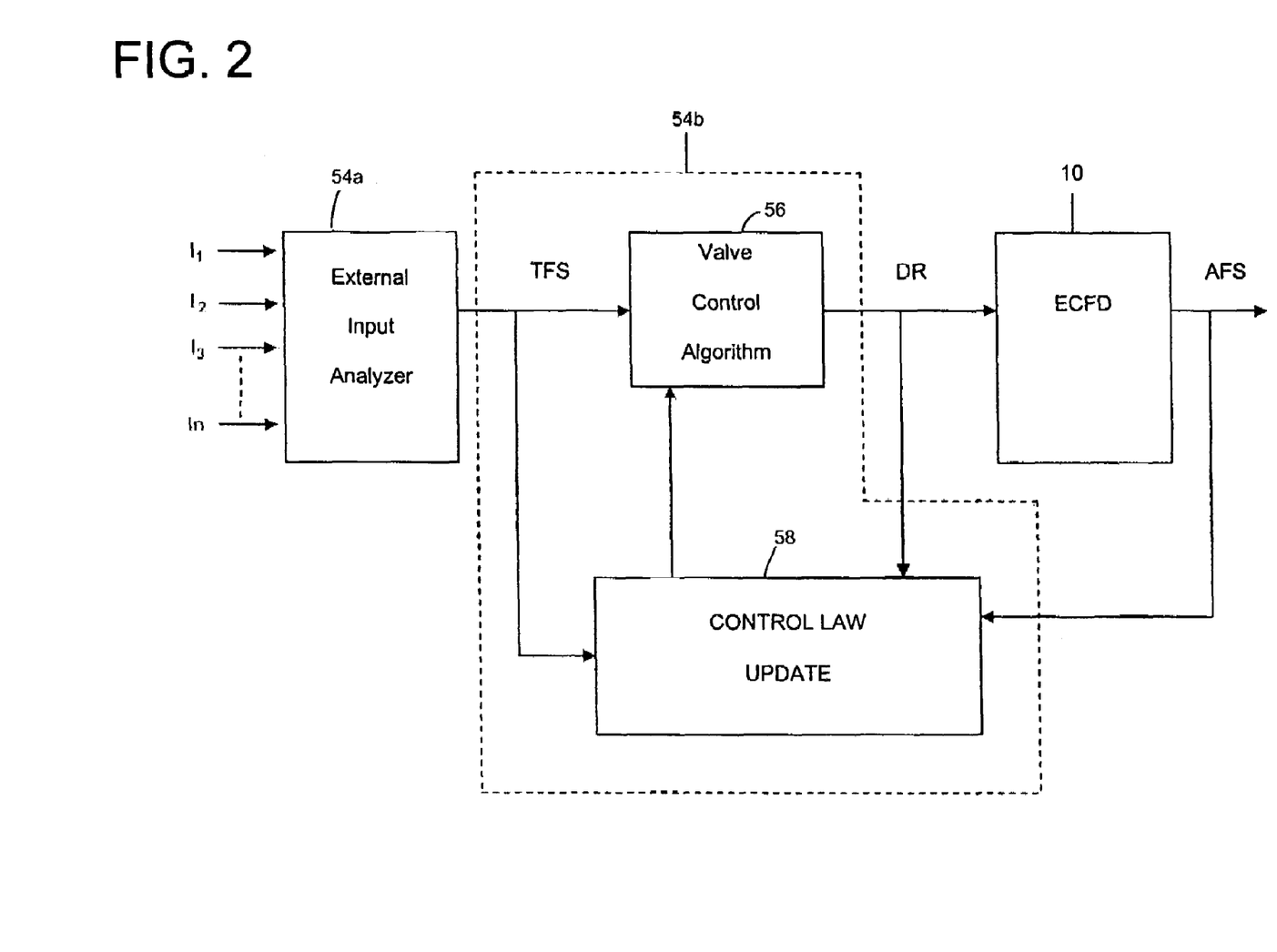
FIG. 2 is a schematic view of the adaptive controller and fan device of the subject invention.

The application of the adaptive controller 54b to the fan device 10 is illustrated schematically in FIG. 2. More particularly, the target fan speed TFS illustrated in FIG. 2 is determined based on sensors at various locations in the vehicle. The specification of the sensors may vary from one vehicle manufacturer to another. However, as noted above, sensors may be operative to identify ambient temperature, coolant temperature, engine speed, vehicle speed and the like. These data are inputs to the external input analyzer 54a. The external input analyzer 54a includes certain logic, i.e. an algorithm, that relate these inputs to a target fan speed TFS. The target fan speed TFS is an input to the adaptive controller 54b and specifically to the valve control algorithm unit 56 thereof. The algorithm includes certain coefficients and produces a duty rate DR as an output to the externally controlled fan device 10. The existing duty rate DR also is provided as an input to the control law update unit 58 of the adaptive controller 54b. Torque is transmitted to the sealed housing 20 and rotates the housing 20 at an actual fan speed AFS based on the duty rate DR and physical characteristics of the fan device 10 existing at a particular point in time. The actual fan speed AFS and the duty rate DR then are inputs back to the control law update unit 58 of the controller 54b. The control law update unit 58 may employ a deterministic autoregressive moving average (DARMA) model or other such model to represent the performance of the ECFD 10. A DARMA model representation of the externally controlled fan device (ECFD) 10 input-output behavior may be given by the relationship:

$$a_0 AFS(t) = -\sum_{j=1}^{n_1} a_j AFS(t-j) + \sum_{j=0}^{m_1} b_j DR(t-j-d); t \geq 0$$

More particularly, the control law update unit 58 uses certain algorithms, like the recursive least square algorithm, along with past values of AFS and present and past values of DR to estimate the model coefficients $a_j$ and $b_j$ that will best represent the present behavior of the ECFD 10. After these model coefficients are identified, they are used in the control law update unit 58 for solving a series of equations to estimate new control coefficients ($p_1$, $p_2$, $l_1$, $l_2$, M, etc) to determine a new duty rate DR value. The valve control algorithm 56 to calculate the duty rate may be substantially as follows:

$$DR(t) = \frac{1}{l_1}[M(TFS(t)) - (p_1 AFS(t) + p_2 AFS(t-1)) - l_2 DR(t-1)]$$

As a result, the control law update unit 58 may use the model coefficients to update the control logic in order to dictate a new duty rate DR for more closely matching the actual fan speed AFS to the target fan speed TFS. This process is carried out continually to ensure that the actual fan speed AFS is at or very close to the target fan speed TFS throughout the operation.

FIGS. 4a-4d demonstrates actual test data. The test was carried out using a temperature control test bed referred to herein as a "hot box". The hot box is an enclosed system having a main drive motor with a speed control. The inside temperature is maintained constant at preset values with the help of a PLC controller. The fan clutch system was coupled to the shaft of the motor and positioned in a shroud of known diameter to simulate the in-vehicle system resistance. The electric motor use in the test is capable of running at speeds up to 4,500 RPM. A fiber-optic speed sensor was mounted in the hot box near the motor shaft to measure the input shaft speed (IS).

The experimental adaptive controller used a rapid prototyping system for converting each signal into signals that can be inputted into a computer with provisions for interfacing the clutch cable and the fiber-optic speed sensor. Frequency to-voltage converters were used to convert the input speed reading and the fan speed reading from frequency to voltage signals, which were then fed to two channels of an A/D board. Tests then were performed at various input speeds and various target fan speeds. The test results are illustrated in FIGS. 4a-4d. In each of these figures, the horizontal line IS represents the input speed, which correspondence to the rotational speed of the shaft 16 shown in FIG. 1. The stepped rectangular line shown in these figures represents the target fan speed entered as an input to the test apparatus. In actual practice, the target fan speed TFS would be developed based on inputs from various sensors on the vehicle. The actual fan speed AFS is represented by the non-rectangular and non-linear line on the graphs. These graphs show that the adaptive externally controlled fan drive 10 was able to have the actual fan speed AFS closely follow the target fan speed TFS at different input speeds and with frequent changes in the target fan speed TFS.

Figure 3:
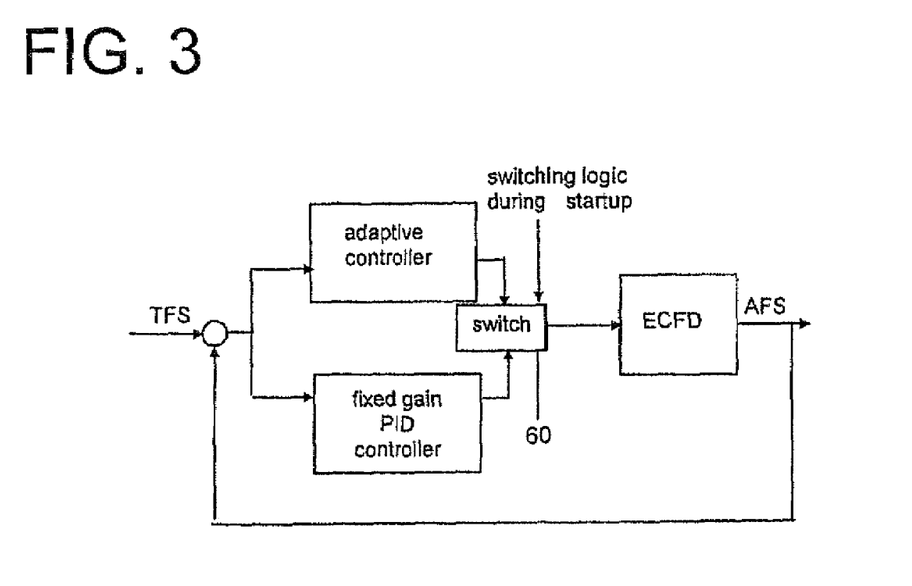
FIG. 3 is a schematic view of an alternate adaptive controller with means for fixed control during a short interval prior to startup of an engine.
Figure 4A:
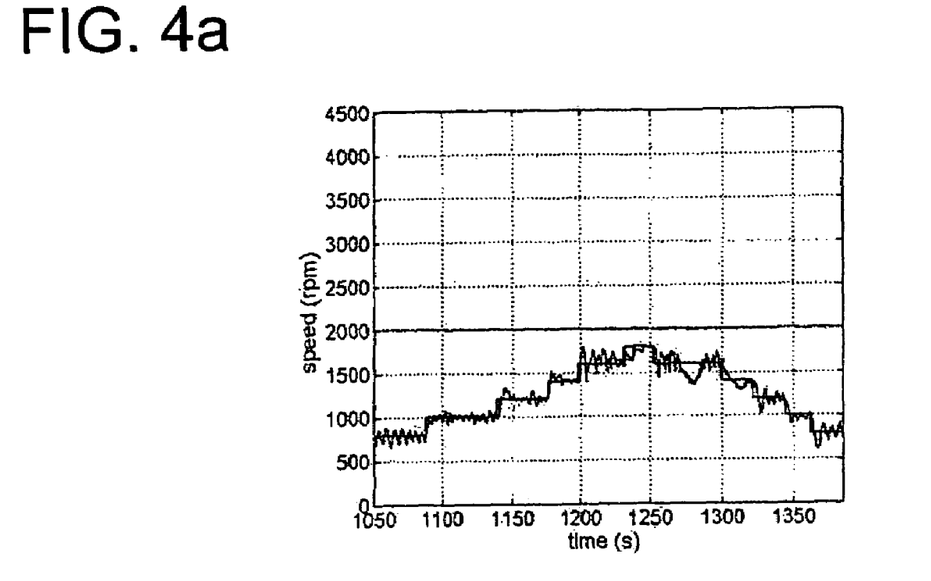
FIGS. 4a-4d show the performance of an adaptive externally controlled fan coupling device.
Figure 4B:
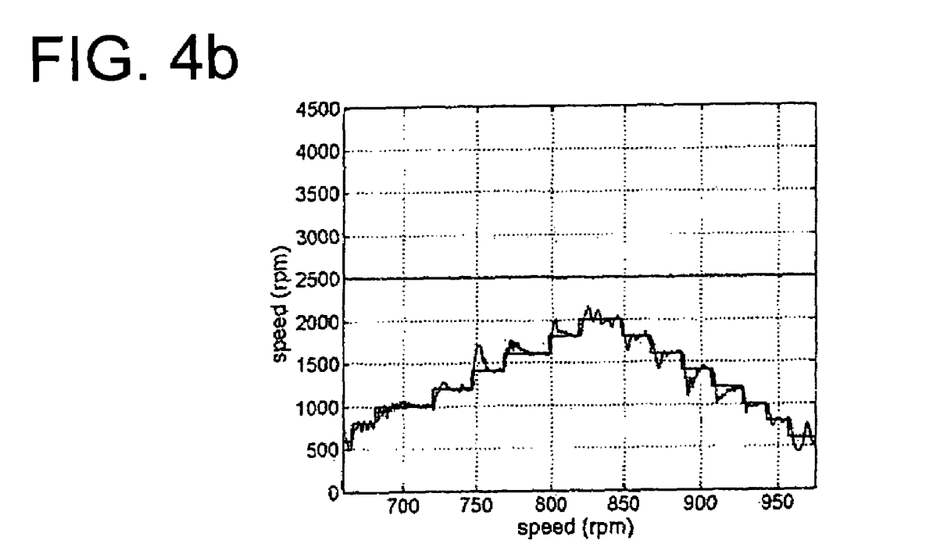
Figure 4C:
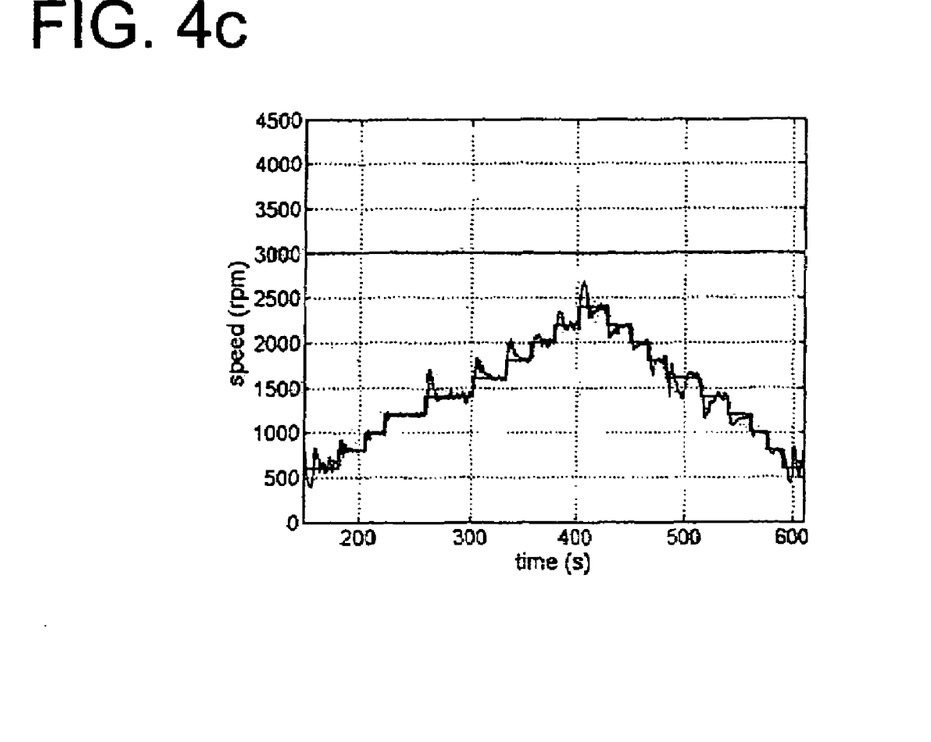
Figure 4D:
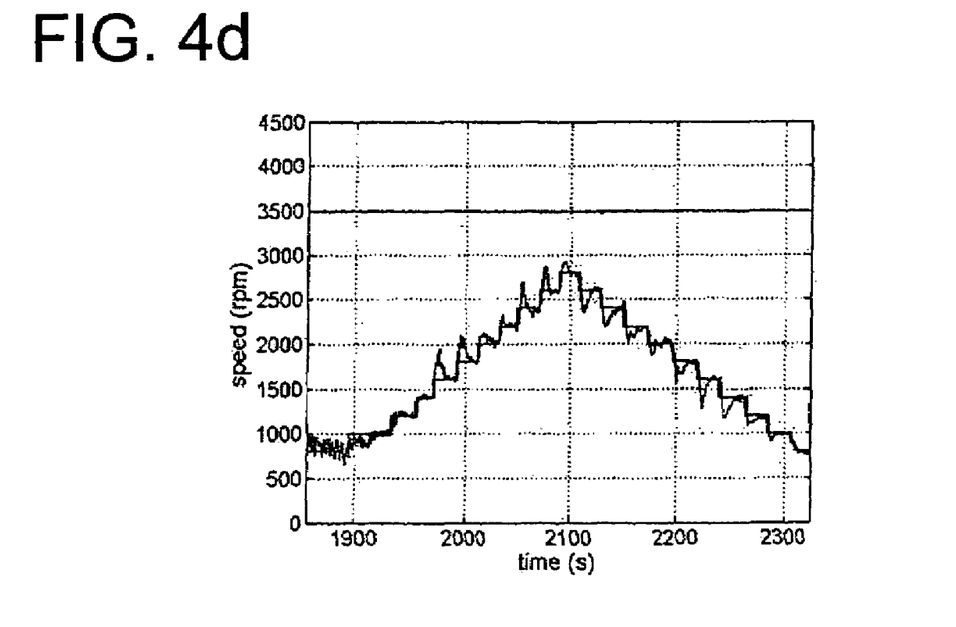

The above-described procedure cannot be used directly when the engine is started because there is no history for assessing the ability of the duty rate DR to achieve the actual fan speed AFS. Accordingly, FIG. 3 shows a controller that further includes a fixed gain PID controller that utilizes a known specified algorithm to produce a duty rate DR that ideally would achieve the target fan speed TFS. The apparatus of FIG. 3 further includes a switch 60 that switches to the above-described adaptive controller 54b after a sufficient history of duty rates DR and actual fan speeds AFS can be developed following the engine startup. The switch 60 typically can be activated after 60-120 seconds of engine operation.

The adaptive controller 54 can be used for other purposes as well. For example, the externally controlled fan coupling device 10 may be calibrated for a particular vehicle with a specific array of accessories. A vehicle manufacturer may provide different arrays of accessories for certain vehicles in a particular line of vehicles. For example, some vehicles from a manufacturer may have a unique air conditioning system that could significantly affect the externally controlled fan device 10. In the prior art, such a change would require a complex, time consuming and costly recalibration of the controller for externally controlled fan coupling device 10. However, the adaptive controller 54 can avoid such complex recalibration. In this regard, the adaptive controller 54 will generate signals to adjust the duty rate DR up or down so that the actual fan speed AFS conforms to the cooling requirements.

The invention has been described with respect to a preferred embodiment of an externally controlled fan device 10. However, it will be understood by those skilled in the art that the adaptive controller of the subject invention can be used with other types of fluid clutches. For example, the adaptive controller can be used with the above-identified fluid clutches that employ a "smart fluid" with a viscosity that can be varied for altering the torque applied to the casing of the fan device. More particularly, the adaptive controller may update the control logic that operates the electromagnet to change the viscosity of the liquid in much the same way that the duty rate of a valve is varied.

What is claimed is:

1. An externally controlled fan device, comprising:
   an external controller for receiving inputs indicative of a target fan speed appropriate for the cooling needs of an engine;
   a fluid clutch for transferring torque to the fan device for achieving an actual fan speed, the fluid clutch including a valve for selectively controlling a flow of fluid to a torque transmission chamber;
   means for controlling a duty rate of opening and closing the valve to control the fluid in the torque transmission chamber and thereby controlling the actual fan speed;
   means for measuring and storing fluid control data at each of a plurality of intervals;
   means for measuring and storing the actual fan speed at each of a plurality of intervals; and
   adaptive control means for developing and sequentially updating an algorithm based on the measured and stored fluid control data and the measured and stored actual fan speeds and for producing a fluid control signal to adaptively control the fluid for substantially conforming the actual fan speed to the target fan speed.

2. The externally controlled fan device of claim 1, wherein the means for controlling the fluid comprises an electromagnet, the adaptive control means being operative for transmitting a duty rate signal to the electromagnet for selectively controlling the fluid.

3. A method for adaptively controlling a fan device, the fan device having a fluid clutch with a fluid for selectively applying torque for rotating a fan at an actual fan speed proportional to the torque, the method comprising:
   inputting a target fan speed selected to accommodate cooling needs of an engine;
   operating an electromagnet for sequentially opening and closing a valve for controlling fluid in the fluid clutch and for thereby controlling the actual fan speed, the electromagnet being pulse width modulated for adjusting a duty rate for opening and closing the valve;
   measuring and storing duty rate data for each of a plurality of intervals;
   measuring and storing the actual fan speed at each of the plurality of intervals;
   comparing the actual fan speed to the target fan speed at each of the plurality of intervals; and
   developing and updating a deterministic auto-regressive algorithm based at least on the measured and stored duty rates and the measured and stored actual fan speed to adaptively control the fluid for substantially conforming the actual fan speed to the target fan speed.

4. The method of claim 3, wherein the step of developing and applying an algorithm includes applying a variable forgetting factor for deleting actual fan speeds and duty rate data older than a selected age.

5. The method of claim 3, further comprising operating the fan device pursuant to a fixed gain proportional-integral-derivative control strategy for a selected period of time after an engine start-up.

6. The method of claim 5, wherein the selected period of time is less than 120 seconds.

\* \* \* \* \*